UNITED STATES PATENT OFFICE.

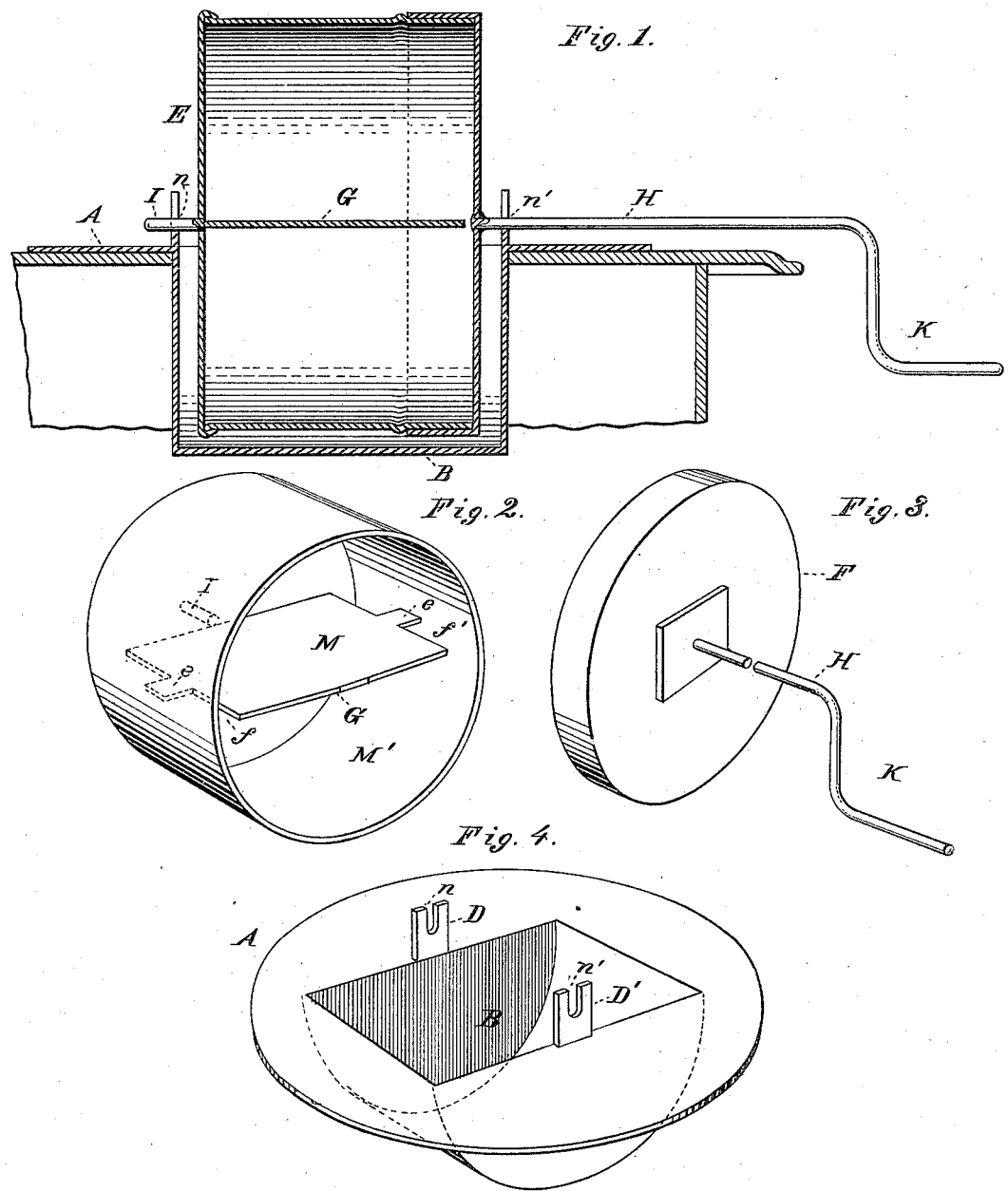

MICHAEL HOLMES, OF LODI, WISCONSIN.

COFFEE-ROASTER.

SPECIFICATION forming part of Letters Patent No. 311,322, dated January 27, 1885.

Application filed March 26, 1884. (No model.)

*To all whom it may concern:*

Be it known that I, MICHAEL HOLMES, a citizen of the United States, residing at Lodi, in the county of Columbia and State of Wisconsin, have invented certain new and useful Improvements in Coffee-Roasters; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a vertical sectional view of my device. Fig. 2 is a perspective view of the cylinder. Fig. 3 is a perspective view of the cap or cover, and Fig. 4 is a perspective view of the stove-lid.

This invention has relation to a device for roasting coffee or other similar substances; and it consists in the construction and novel arrangement of devices, as will hereinafter be fully described, and particularly pointed out in the appended claim.

The stove-lid A, which I prefer to use in connection with the roaster, is provided with a semi-cylindrical depression, B, of slightly larger diameter than the rotating vessel E. At the centers of the sides of the depression are secured small vertically-projecting plates D D', provided with notches $n\ n'$ in their upper edges, which serve as bearings for the rods H I.

The roaster consists of two separable parts—the cylindrical vessel E and the flanged lid F. G is a transverse diaphragm fixed in position in the vessel E at right angles to its base by means of the small extensions $e\ e$ on its edges, which are secured at their ends to the inner surface of the cylindrical vessel. This divides the vessel into two portions, M M', which construction leaves marginal intervals $f\ f'$ between the edges of the diaphragm and the inner cylindrical surface of the vessel E. The diaphragm extends from the base of the vessel to the inner surface of the lid. A long rod, H, is centrally secured at one end in any suitable manner to the outer flat surface of the lid F, and is bent into a crank, K, at its further end. A short rod, I, is similarly secured to the outer surface of the base of the vessel E. When the stove-plate A is in position over the pot-hole of the stove and the roaster is set in the depression of the stove-plate, the rods H and I being in the notches $n\ n'$, the lower portion of the vessel E will be heated by radiation from the depression, which extends down into the stove. The coffee is kept well stirred by rotating the roaster by means of the crank K. The diaphragm G keeps the coffee about equally divided between the chambers M M' of the vessel, and the action of the heat is rendered more equal or diffused better with reference to the contents, which are kept well distributed in the chambers of the vessel.

I am aware that it is not new to form a coffee-roaster in two cylindrical sections hinged together and provided with a central rod or crank for rotating them, and that others have been formed of a single section having closed ends and an inner diaphragm. I am also aware that it is not new to form a depression in a stove-lid for the reception of a cylindrical roasting-vessel supported in bearings, and therefore do not claim such constructions, broadly.

I am aware that various devices have been constructed for roasting coffee, some of which have a stove-lid provided with an opening and bearings to support a cylindrical vessel which is composed of two sections, one carrying a crank-handle and the other a spindle to support the vessel, and others have been provided with means for dividing the coffee while the vessel is being rotated, and I therefore do not wish to be understood as claiming any of these devices, broadly; but, Having described this invention, what I claim as new, and desire to secure by Letters Patent, is—

In a coffee-roaster, the rotating cylinder E, having the diaphragm G, secured to the inner walls thereof by the end extensions, $e\ e$, leaving marginal intervals $f$ between the edges of the said diaphragm and the walls of the vessel, whereby when the vessel is rotated the coffee will be gradually fed to and kept against the heated walls of the cylinder, substantially as specified.

In testimony whereof I affix my signature in presence of two witnesses.

MICHAEL HOLMES.

Witnesses:
WIMAN C. HARWOOD,
HARLEY SIMONS.